Patented Oct. 27, 1925.

1,558,846

UNITED STATES PATENT OFFICE.

JUDSON A. DE CEW, OF NEW YORK, N. Y., ASSIGNOR TO PROCESS ENGINEERS, INC., OF NEW YORK, N. Y., A CORPORATION OF NEW YORK.

PAPER-SIZING PROCESS.

No Drawing. Original application filed April 11, 1923, Serial No. 631,371. Divided and this application filed July 14, 1925. Serial No. 43,621.

*To all whom it may concern:*

Be it known that I, JUDSON A. DE CEW, a subject of the King of Great Britain, and resident of New York city, in the county and State of New York, have invented certain new and useful Improvements in Paper-Sizing Processes, of which the following is a specification.

In the sizing of paper it is customary to use emulsions of rosin soap and these emulsions are coagulated while in contact with the fibres by means of an acid salt such as sulphate of alumina.

This reaction produces a preciptate containing resinate of alumina, resin hydrate and aluminum hydrate, and the proportion of each depends upon the acidity and amount of the acid salt.

If an acid is used to precipitate a rosin size, resin hydrates are produced which have a coarse flocculent character and but little sizing value.

If a well saponified rosin soap is used and it is precipitated with nearly theoretical proportions of sulphate of alumina, then larger quantities of resinate of alumina are formed. The purpose of this invention is to produce a coagulate consisting of hydrate of alumina and resin hydrate in a highly dispersed condition. In order to accomplish this I utilize the discovery that I have made that alumina hydrate will itself coagulate emulsions of rosin.

Rosin emulsions may be made by diluting a rosin soap or may be made mechanically by grinding in water.

These rosin particles have a negative electrical charge whereas the colloidal particles of alumina hydrate have a positive charge, and when the alumina particles come into contact with the rosin particles a coagulating effect takes place.

This reaction is slow and on that account it is possible to obtain a fine distribution of the coagulate over the pulp fibres, if the reaction takes place in the paper pulp. In carrying out this process I may produce a precipitate of alumina in the pulp either before or after adding the rosin emulsions, and these are allowed to mix together until the emulsions are coagulated. After that a solution of sulphate of alumina is added, which removes any alkalinity in the stock and makes the fibres astringent and further develops the sizing properties of the rosin precipitate, but does not under these conditions, form resinate of alumina.

This present application contains matter divided out from my copending application Serial No. 631,371, which relates to the sizing of paper by the use of rubber emulsions.

Having thus described my invention, what I claim is:—

1. A method of coagulating emulsions of rosin soap, which consists in bringing them into contact with colloidal aluminum hydrate.

2. A method of sizing paper pulp, which consists in treating the pulp with rosin emulsions and colloidal aluminum hydrate, and after the rosin emulsions are coagulated, adding sulphate of alumina.

3. A method of sizing paper pulp, which consists in depositing on the fibres a precipitate of alumina hydrate, and then adding an emulsion of rosin, and mixing the material until the emulsions coagulate and then adding an acid salt of alumina.

4. A method of sizing paper pulp, which consists in treating the pulp with emulsions of rosin soap, then adding a colloidal aluminum hydrate, and after this has coagulated the emulsions, adding sulphate of alumina.

In testimony whereof I affix my signature.

JUDSON A. DE CEW.